(12) United States Patent
Iwamura

(10) Patent No.: US 10,018,991 B2
(45) Date of Patent: Jul. 10, 2018

(54) NUMERICAL CONTROLLER WITH FUNCTION OF PREVENTING ERRONEOUS INPUT OF TOOL OFFSET DATA

(71) Applicant: FANUC Corporation, Minamitsuru-gun, Yamanashi (JP)

(72) Inventor: Yamato Iwamura, Minamitsuru-gun (JP)

(73) Assignee: FANUC Corporation, Minamitsuru-gun, Yamanashi (JP)

( * ) Notice: Subject to any disclaimer, the term of this patent is extended or adjusted under 35 U.S.C. 154(b) by 201 days.

(21) Appl. No.: 15/072,387

(22) Filed: Mar. 17, 2016

(65) Prior Publication Data

US 2016/0282840 A1    Sep. 29, 2016

(30) Foreign Application Priority Data

Mar. 26, 2015   (JP) ................................. 2015-064240

(51) Int. Cl.
*G06F 19/00* (2018.01)
*G05B 19/4093* (2006.01)

(52) U.S. Cl.
CPC .................. *G05B 19/40938* (2013.01); *G05B 2219/36266* (2013.01); *G05B 2219/50296* (2013.01); *Y02P 90/265* (2015.11)

(58) Field of Classification Search
CPC ..................... G05B 19/402; G05B 2219/50289
See application file for complete search history.

(56) References Cited

U.S. PATENT DOCUMENTS

2007/0050079 A1* 3/2007 Itoh .................. G05B 19/40938
                                                      700/179
2012/0300235 A1* 11/2012 Ohmura ............. G03G 15/1635
                                                       358/1.9
2013/0268108 A1    10/2013 Ogawa et al.
2015/0220077 A1    8/2015 Reiser et al.
2017/0220025 A1*  8/2017 Kawai .................. G05B 19/404

FOREIGN PATENT DOCUMENTS

| CN | 102069421 A | 5/2011 |
| CN | 102862093 A | 1/2013 |
| CN | 103728918 A | 4/2014 |
| JP | H05-84631 A | 4/1993 |
| JP | H11-85201 A | 3/1999 |
| JP | 2008-197859 A | 8/2008 |
| JP | 2009-080621 A | 4/2009 |
| JP | 2013-218534 A | 10/2013 |
| WO | WO-2014/048821 A1 | 4/2014 |

OTHER PUBLICATIONS

Decision to Grant a Patent dated Feb. 28, 2017 in Japanese Patent Application No. 2015-064240 (3 pages) with an English translation (3 pages).
The Notification of the First Office Action dated Jan. 2, 2018 in Chinese Patent Application No. 2016101823768 (5 pages) with an English translation (7 pages).

* cited by examiner

*Primary Examiner* — Vincent Tran

(74) *Attorney, Agent, or Firm* — Drinker Biddle & Reath LLP

(57) ABSTRACT

A numerical controller of the invention analyzes a relation between a plurality of pieces of tool dimension data and a plurality of tool offset values and detects whether a tool offset value is an outlier on the basis of tool dimension data of a subject tool and a tool offset value received by an offset value input unit.

2 Claims, 4 Drawing Sheets

EXAMPLE OF DETERMINATION ON TOOL OFFSET VALUE ON BASIS OF RELATION

SCREEN FOR SETTING TOOL OFFSET VALUE

T06: TOOL LENGTH=110.0,
TOOL DIAMETER=40.0

| OFFSET VALUE OF TOOL LENGTH | 1800 ■ |
| OFFSET VALUE OF TOOL DIAMETER | |

OFFSET VALUE OF TOOL LENGTH IS TOO LARGE COMPARED TO TOOL LENGTH!!

FIG. 1A

TOOL DIMENSION DATA STORAGE AREA

| TOOL NUMBER | TOOL DIMENSION DATA | | |
|---|---|---|---|
| | TOOL LENGTH | TOOL DIAMETER | ... |
| T01 | 100.0 | 10.0 | |
| T02 | 80.0 | 15.0 | |
| T03 | 150.0 | 20.0 | |
| T04 | 50.0 | 5.0 | |
| T05 | 120.0 | 10.0 | |
| ⋮ | ⋮ | ⋮ | |

FIG. 1B

TOOL OFFSET VALUE STORAGE AREA

| TOOL NUMBER | TOOL OFFSET VALUE | |
|---|---|---|
| | OFFSET VALUE OF TOOL LENGTH | OFFSET VALUE OF TOOL DIAMETER |
| T01 | 70.0 | 10.0 |
| T02 | 50.5 | 15.0 |
| T03 | 120.0 | 20.0 |
| T04 | 25.3 | 5.0 |
| T05 | 89.6 | 10.0 |
| ⋮ | ⋮ | ⋮ |

EXAMPLE OF DETERMINATION ON TOOL
OFFSET VALUE ON BASIS OF RELATION

| SCREEN FOR SETTING TOOL OFFSET VALUE |  |
|---|---|
| T06: TOOL LENGTH=110.0, TOOL DIAMETER=40.0 | |
| OFFSET VALUE OF TOOL LENGTH | 1800 ▮ |
| OFFSET VALUE OF TOOL DIAMETER | |
| OFFSET VALUE OF TOOL LENGTH IS TOO LARGE COMPARED TO TOOL LENGTH!! | |

NUMERICAL CONTROLLER WITH FUNCTION OF PREVENTING ERRONEOUS INPUT OF TOOL OFFSET DATA

RELATED APPLICATION DATA

This application claims priority under 35 U.S.C. § 119 and/or § 365 to Japanese Application No. 2015-064240 filed Mar. 26, 2015, the entire contents is incorporated herein by reference.

BACKGROUND OF THE INVENTION

1. Field of the Invention

The present invention relates to a numerical controller, and particularly, to a numerical controller with a function of preventing an operator from erroneously inputting tool offset data.

2. Description of the Related Art

When a machine tool is operated by a control of a numerical controller, it is necessary to input an offset value as data relating to a tool used for machining before executing a machining program. The numerical controller decides a tool path or performs an interference check on the basis of the data relating to the tool and the machining program.

When an operator inputs data relating to a tool, a decimal point is omitted or an erroneous offset value is input due to a mistake in operating a key in some cases. In these cases, since the numerical controller decides a tool path on the basis of the erroneous correction amount, the tool is controlled along the tool path different from what the operator supposes, and thus there is a concern that the tool interferes with and damages a workpiece, a table, a jig, or the like.

Heretofore, to solve this problem, functions of preventing erroneous operation of an operator at the time of input are introduced. One among them, for example, JP 2009-080621 A discloses a function of setting a range of inputtable values in advance and alerting an operator when a value outside the range is input (FIG. 5).

In addition, it is considered that the problem is solved in such a manner that a result of erroneous input can be recognized on the spot by drawing an image according to the input data.

However, in the method of setting an inputtable range in advance as in JP 2009-080621 A, it is necessary that dedicated information is set in advance and the operator calculates the range.

In addition, in the case of displaying an image of a tool and an offset amount by drawing, a plurality of tools have to be displayed side by side in order that the operator can make a determination at a glance, and thus since it is necessary to widen an area in which tools are displayed side by side, there is a problem that the number of pieces of data which can be displayed at one time is decreased.

SUMMARY OF THE INVENTION

An object of the invention is to provide a numerical controller which can detect erroneous input of an operator even when dedicated data and a dedicated display area are not prepared in advance.

The numerical controller of the invention is capable of setting a tool offset value for a subject tool where tool dimension data is set, and includes an offset value input unit receiving input of the tool offset value for the subject tool, a storage unit storing a plurality of pieces of tool dimension data associated with a tool and a plurality of tool offset values associated with the tool, a tool data analysis unit analyzing a relation between the plurality of pieces of the tool dimension data and the plurality of tool offset values on the basis of the plurality of pieces of tool dimension data and the plurality of tool offset values stored in the storage unit, an outlier detection unit detecting whether the tool offset value received by the offset value input unit is an outlier on the basis of the relation between the plurality of pieces of tool dimension data and the plurality of tool offset values, the tool dimension data of the subject tool, and the tool offset value received by the offset value input unit, and an alert unit issuing an alert in a case where it is detected that the tool offset value is an outlier.

The storage unit may include a tool dimension data storage area storing a tool dimension data in association with a tool used in the numerical controller and a tool offset value storage area storing a tool offset value in association with the tool.

According to the invention, even when dedicated data is not set and a dedicated display area is not prepared in advance, erroneous input can be found only by using data relating to a dimension used in a simulation or the like, and thus an erroneous machining can be prevented in advance.

BRIEF DESCRIPTION OF THE DRAWINGS

The above object, other objects, and features of the invention will become clear through the description of the following embodiments with reference to the accompanying drawings as follows:

FIG. 1A is a diagram describing an outline of an erroneous input prevention function of the invention and illustrating a tool dimension data storage area;

FIG. 1B is a diagram describing the outline of the erroneous input prevention function of the invention and illustrating a tool offset data storage area;

DETAILED DESCRIPTION OF THE PREFERRED EMBODIMENTS

In the present embodiment, when an operator inputs offset data of an tool, it is determined whether the offset data input by the operator is an outlier with respect to a dimension of the tool subject to input on the basis of a relation between tool dimension data of the tool in which data has already been input and offset data set for the tool. Erroneous input of the operator such as omission of a decimal point and registration of data in another tool is prevented.

Figures 1C, 1D:
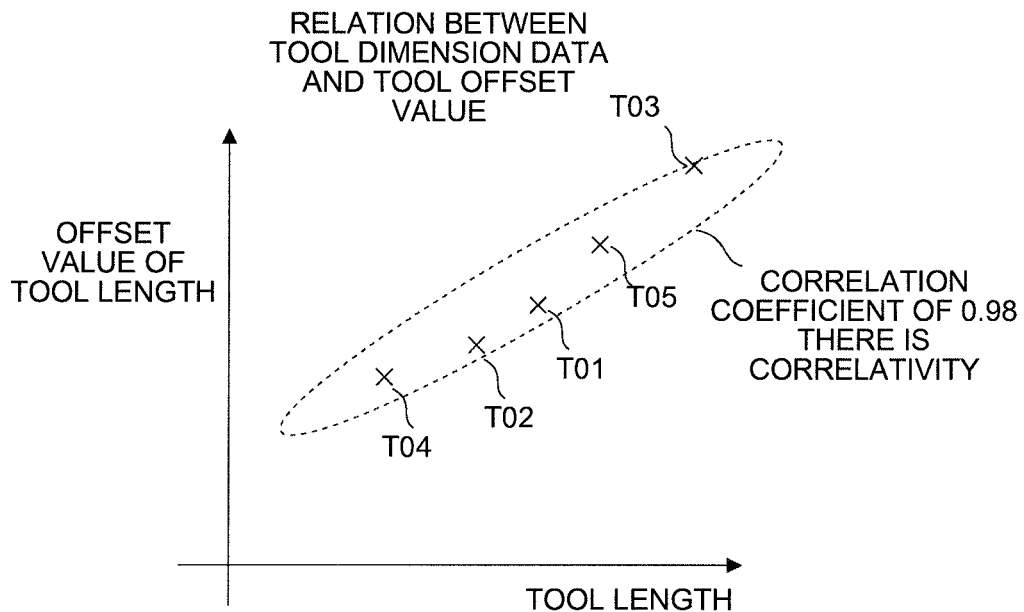
FIG. 1C is a diagram describing the outline of the erroneous input prevention function of the invention and illustrating a relation between tool dimension data and a tool offset value.
FIG. 1D is a diagram describing the outline of the erroneous input prevention function of the invention and illustrating an example of determination on a tool offset value on the basis of the relation between the tool dimension data and the tool offset value.

An erroneous input prevention function of the embodiment is described using an example of FIG. 1. For example, it is assumed that the tool dimension data (a tool length, a tool diameter, . . . ) is set in a numerical controller as illustrated in FIG. 1A and the tool offset value (an offset value of the tool length, an offset value of the tool diameter) is set for each of tools as illustrated in FIG. 1B. At this time, there is correlativity between the tool length of the tool dimension data and the offset value of the tool length which are set for each tool, as illustrated in a graph of FIG. 1C.

When a tool offset value is newly set, on the basis of the correlation between the tool length and the offset value of the tool length of the tool which have already been set, the outlier detection is performed using the newly input offset value of the tool length and the tool dimension data of the subject tool. When it is detected that the input offset value of the tool length is an outlier, an alert is issued.

In an example of FIG. 1D, when the offset value of the tool length is set to 180.0 with respect to a tool T06 having the tool length of 110.0 and the tool diameter of 40.0, the operator erroneously omits the decimal point and inputs 1800 as the offset value. In this case, considering the relation between the tool dimension data (FIG. 1A) and the tool offset values (FIG. 1B) of the tools which have already been set, the input value is determined to be an outlier and an alert is displayed.

Figure 2:
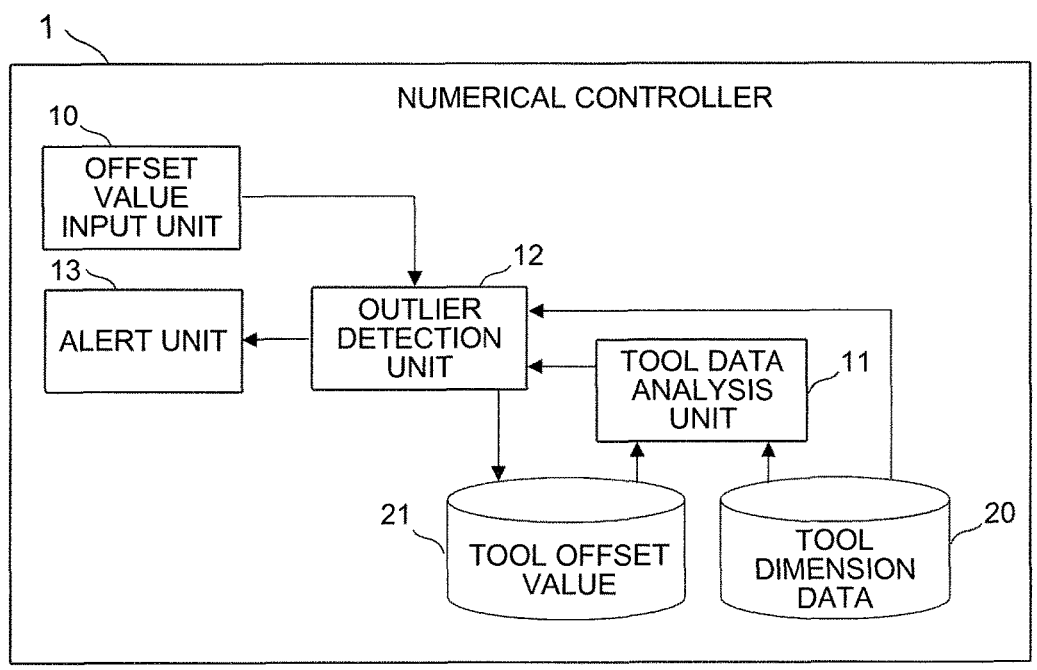
FIG. 2 is a functional block diagram of a numerical controller according to an embodiment of the invention.

FIG. 2 is a functional block diagram of a numerical controller according to one embodiment of the invention with the above-described erroneous input prevention function. A numerical controller 1 of the embodiment includes an offset value input unit 10, a tool data analysis unit 11, an outlier detection unit 12, an alert unit 13, a tool dimension data storage area 20, and a tool offset value storage area 21.

The offset value input unit 10 receives input of a tool offset value of a tool designated by the operator and outputs the value to the outlier detection unit 12.

The tool data analysis unit 11 analyzes a relation between tool dimension data and a tool offset value in such a manner that a statistical analysis is performed on the basis of tool dimension data stored in the tool dimension data storage area 20 provided on a memory of the numerical controller 1 and a tool offset value stored in the tool offset value storage area 21.

As an example of the analysis performed by the tool data analysis unit 11, regression analysis is exemplified in which a tool length, a tool diameter, and the like included in tool dimension data are set as explanatory variables and a tool offset value is set as an object variable. For example, a correlation coefficient between the tool length and the offset value of the tool length and a correlation coefficient between the tool diameter and the offset value of the tool diameter are obtained, and in a case where each of absolute values of the obtained correlation coefficients is equal to or more than a predetermined value (for example, 0.4 or more), it is determined that there is correlativity. The tool data analysis unit obtains a regression equation for combination with the correlativity and outputs the equation to the outlier detection unit 12. In the example of FIG. 1C, a correlation coefficient between the tool length and the offset value of the tool length is 0.98, and thus it is determined that both values have correlativity. The tool data analysis unit obtains a linear regression equation between the tool length and the offset value of the tool length and outputs the equation to the outlier detection unit 12.

As another example of the analysis performed by the tool data analysis unit 11, a method is exemplified in which the correlation is more precisely analyzed in such a manner that by using the kinds of tools included in the tool dimension data, a relation between the tool length or the tool diameter of the same kind of tool and the corresponding offset value is weighted compared to relations in the other kinds of tools.

On the basis of the relation between the tool dimension data and the tool offset value which is analyzed by the tool data analysis unit 11, the outlier detection unit 12 performs the outlier detection using the tool offset value input from the offset value input unit 10 and the tool dimension data, which is stored in the tool dimension data storage area 20, of the tool subject to input of the tool offset value. Whether the tool offset value input from the offset value input unit 10 has the same relation with the tool dimension data as the relation between the tool dimension data and the tool offset value which is analyzed by the tool data analysis unit 11 or not is detected. Then, in a case where it is detected that the tool offset value input from the offset value input unit 10 is not an outlier, the outlier detection unit 12 stores the tool offset value in the tool offset value storage area 21. In a case where it is detected that the tool offset value is an outlier, the outlier detection unit 12 instructs the alert unit 13 to issue an alert.

Figure 3:
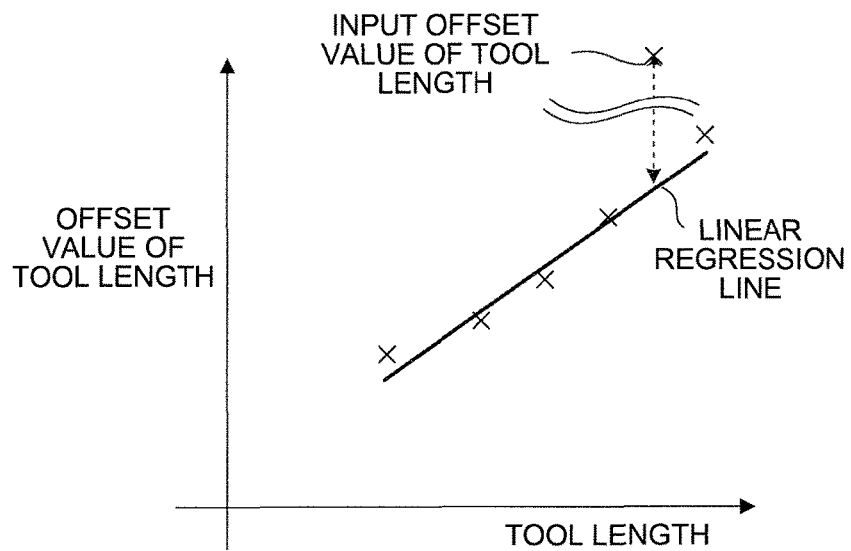
FIG. 3 is a diagram describing a concept of an outlier according to the embodiment of the invention.

A method in which the outlier detection unit 12 detects the outlier is exemplified below. First, a combination of the tool offset value input from the offset value input unit 10 and the corresponding tool dimension data is obtained. Next, in a case where a distance between the combination and a linear approximation curve between the tool dimension data and the tool offset value analyzed by the tool data analysis unit 11 is equal to or more than a predetermined value, it is detected that the combination is an outlier. For example, FIG. 3 is a graph obtained by obtaining and drawing the linear approximation curve between the tool length and the offset value of the tool length on the basis of an example of FIG. 1. Here, the value input by the operator (the tool offset value of 1800 with respect to the tool of the tool length of 110) is plotted, and a distance between the plotted point and the linear approximation curve is obtained. In a case where the distance is equal to or more than a predetermined distance which is set in advance, it can be detected that the offset value of the tool length input by the operator is an outlier.

As the method in which the outlier detection unit 12 detects an outlier, a statistical verification may be used as below.

Procedure 1) The relation between the tool dimension data and the tool offset value approximates to a linear line shown as the following Equation (1). Values of a and b in Equation (1) are obtained by a least-squares method.

$$y = ax + b \quad (1)$$

Procedure 2) The tool dimension data and the tool offset value which have already been input are applied to the equation obtained in Procedure 1 and then, a difference value ε thereof is obtained.

Procedure 3) An average (μ) and a variance (σ²) of the difference value ε obtained by Procedure 2 are obtained.

Procedure 4) Assuming that the difference between Equation (1) and the relation between the tool dimension data and the tool offset value follows a normal distribution, a verification is performed using the following Equation (2).

$$-1.96 \leq (\varepsilon - \mu)/\sigma \leq 1.96 \quad (2)$$

In a case where Equation (2) is satisfied, the tool dimension data and the tool offset value are included in a confidence interval of 95% with respect to Equation (1). Therefore, it can be determined that the relation between the set tool dimension data and the newly input tool offset value is the same as the relation of values input until then. In a case where Equation (2) is not satisfied, it can be detected that the tool offset value input by the operator is an outlier. Further, the value of 1.96 in the above Equation (2) corresponds to the confidence interval of 95% and the interval maybe changed freely.

When receiving an instruction from the outlier detection unit 12, the alert unit 13 issues an alert to the operator. As illustrated in FIG. 1D, the alert may be issued with literal expression or like together with a reason why the input value is erroneous (the value is large, small, or the like) in a screen in which the tool offset value is input. Simply, the alert may be issued with a sound such as a buzzer or a lamp. In addition, the alert may be issued with a combination thereof.

Figure 4:
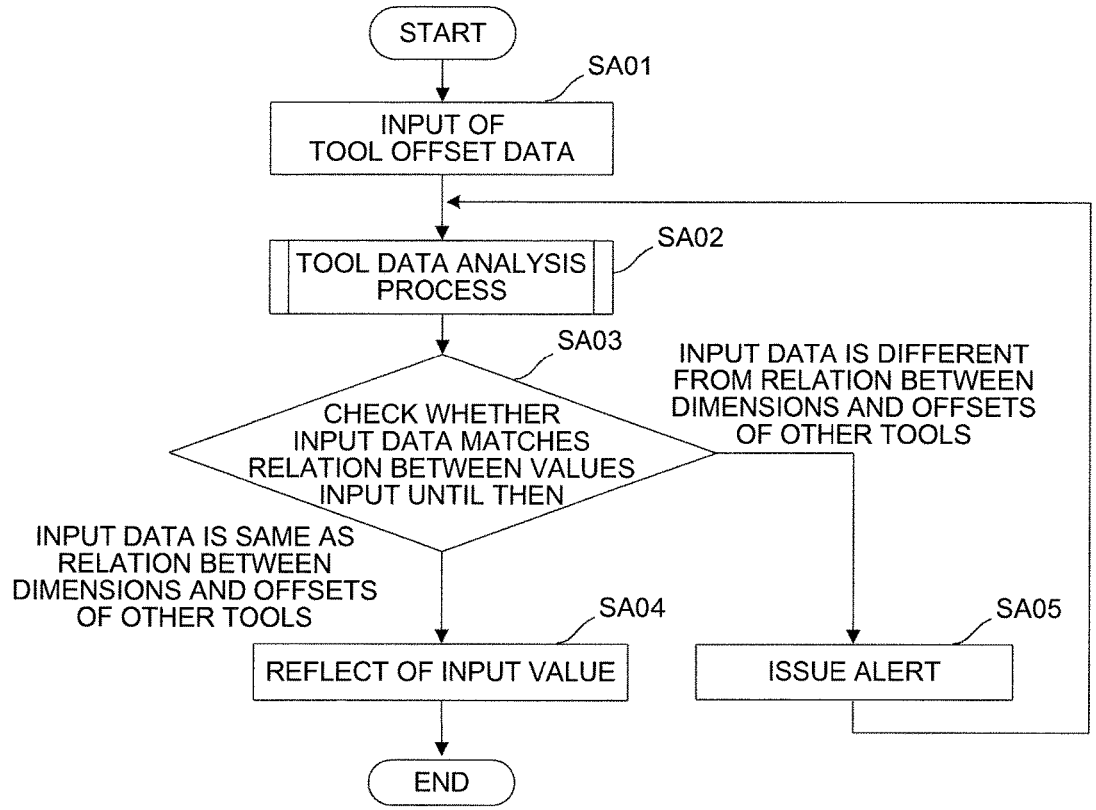
FIG. 4 is a flowchart of an erroneous input prevention process according to the embodiment of the invention.
Figure 5:
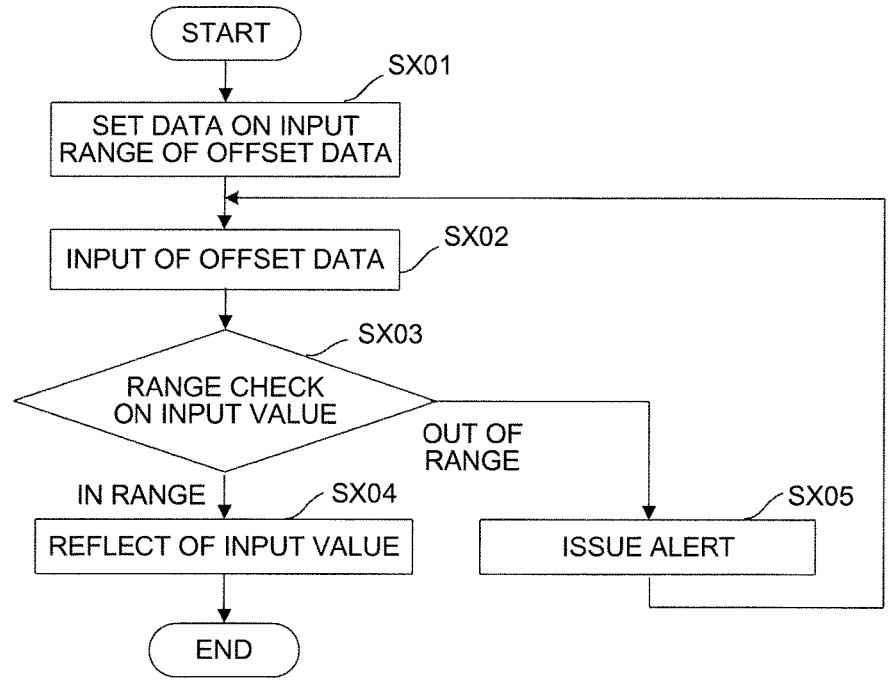
FIG. 5 is a diagram describing an offset value range check function in the related art.

FIG. 4 is a brief flowchart of an erroneous input prevention process executed in the numerical controller of the embodiment.

[Step SA01] The offset value input unit 10 receives input of a tool offset value from the operator.

[Step SA02] The tool data analysis unit 11 executes a statistical analysis on the basis of the tool dimension data stored in the tool dimension data storage area 20 and the tool offset value stored in the tool offset value storage area 21.

[Step SA03] The outlier detection unit 12 checks whether or not a combination of the tool offset value input from the offset value input unit 10 and the tool dimension data of the tool in which the offset value is set matches the relation between the tool dimension data and the tool offset data input until then which is analyzed by the tool data analysis unit 11 (the outlier detection process). In a case where the combination matches the relation, the processing proceeds to Step SA04, and in a case where the combination does not match the relation, the processing proceeds to Step SA05.

[Step SA04] The outlier detection unit 12 reflects the tool offset value input from the offset value input unit 10 to the tool offset value storage area 21.

[Step SA05] The outlier detection unit 12 instructs the alert unit 13 to issue an alert.

As above, in the embodiment, first, a relation between the tool dimension data and the tool offset value set until then in the numerical controller is obtained. Then, in a case where a tool offset value input from then does not match the relation, the tool offset value is considered to be an outlier and an alert is issued. By this way, erroneous input of the operator such as omission of a decimal point and mis-selection of the tool subject to input can be prevented at a certain proportion.

In addition, as the tool dimension data in which theoretical values of the tool diameter and the tool length set in the numerical controller are input, data for drawing the tool in the case of simulating or like are used. Therefore, it is not necessary to prepare dedicated data for detecting erroneous input, and thus a workload of the operator can be reduced compared to the related art.

Hereinbefore, although the embodiment of the invention is described, the invention is not limited to the above-described embodiment and can be implemented in various modes by changing properly.

For example, the tool dimension data and the tool offset value set in the numerical controller in the past are stored as a history. Then, by performing the same process as in the embodiment on the basis of the tool dimension data and the tool offset value stored as a history, the erroneous input prevention function of the invention can be also realized.

In addition, the regression analysis is exemplified as the statistical process in the above-described embodiment, but another statistical analysis method can be employed as long as the analysis of the relation between the tool dimension data and the tool offset value, and the outlier detection can be performed.

In the above-described embodiment, the description is mainly given on the basis of the relation between the tool length and the offset value of the tool length, but the same erroneous input detection can be also performed on the basis of a relation between a tool diameter and an offset value of the tool diameter. Further, the tool length and the tool diameter are exemplified as the tool dimension data, but another tool dimension data may be employed in accordance with a shape or a property of the tool and a technical meaning of the offset value. Further, the tool offset value can also correspond to various offset values in addition to the offset value of the tool length or the offset value of the tool diameter.

The invention claimed is:

1. A numerical controller capable of setting a tool offset value for a subject tool where tool dimension data is set, the numerical controller comprising:
   an offset value input unit receiving input of the tool offset value for the subject tool;
   a storage unit storing a plurality of pieces of tool dimension data associated with a tool and a plurality of tool offset values associated with the tool;
   a tool data analysis unit analyzing a relation between the plurality of pieces of tool dimension data and the plurality of tool offset values on the basis of the plurality of pieces of tool dimension data and the plurality of tool offset values stored in the storage unit;
   an outlier detection unit detecting whether the tool offset value received by the offset value input unit is an outlier on the basis of the relation between the plurality of pieces of tool dimension data and the plurality of tool offset values, the tool dimension data of the subject tool, and the tool offset value received by the offset value input unit; and
   an alert unit issuing an alert in a case where it is detected that the tool offset value is an outlier.

2. The numerical controller according to claim 1, wherein the storage unit includes a tool dimension data storage area storing a tool dimension data in association with a tool used in the numerical controller and a tool offset value storage area storing a tool offset value in association with the tool.

\* \* \* \* \*